United States Patent Office 3,095,888
Patented July 2, 1963

3,095,888
CONTROL OF RATES OF FLOW IN PIPELINE LOOP
Marvin E. Kline and Robert C. Reilly, both of Bartlesville, Okla., assignors to Phillips Petroleum Company, a corporation of Delaware
Filed May 4, 1961, Ser. No. 107,723
5 Claims. (Cl. 137—10)

This invention relates to the control of the rates of flow in a pipeline loop. More particularly, it relates to a method and apparatus for controlling the rates of flow of fluid in a pipeline loop to minimize admixture or blending between successive consignments of different products carried in a pipeline having such a loop.

It is common in the art of transporting petroleum products in pipelines to transport different products simultaneously in the same pipeline. At any one time, for example, a hypothetical pipeline of 100 miles total length might contain a 30 mile "slug" or consignment of gasoline, a succeeding slug of furnace oil of 50 mile length, followed in turn by a 20 mile slug of butane.

It is also common in the art to provide a parallel line, commonly known as a "loop," in certain sections of a single pipeline. Thus the hypothetical 100 mile pipeline, which may be a 12 inch line for example, may have one or several sections wherein the line divides into two 12 inch branches for some distance, beyond which the two branches again merge into a single line. Or in some cases, a 12 inch line may be split into two 10 inch branches or into an 8 inch branch and a 12 inch branch. These double-line portions of a pipeline or loops are for the purpose of increasing the overall capacity of the line, or may have for their purpose the reduction of resistance to flow due to friction and differences of elevation between certain points in the line.

As long as a homogeneous product is passing through a loop, the rates of flow through the different branches is of no particular concern beyond the considerations involved in transport through a single line. However, when a point of separation or interface between successive slugs of different products reaches the looped portion of the pipeline, it then becomes vital to maintain substantially equal velocities in the two branches of the loop. Otherwise, the point of separation between the different products in the two branches of the loop would arrive at the point of recombining to a single line at different times, resulting in blending of one product from one branch with a different product from the other branch, both feeding into the trunk line at the downstream end of the loop pipeline. Such blending or admixture of these different products is undesirable because it may result in contamination of the two products, one with the other, and often necessitate a separation operation such as fractionation.

The reason the product in both branches of the loop may arrive at the downstream end of the loop at different times is because of the different relative velocities or flow rates of product in the two branches, due to such things as the frictional resistance and size of the branches and the flow rate of product in the pipeline upstream from the loop.

Several methods and apparatus have been proposed, patented, or used heretofore to ensure such simultaneous arrival of product at the downstream end of the loop. For example, one conventional method of pipeline monitoring employs the color comparison technique whereby color changes in samples withdrawn from the pipeline are noted to determine the arrival of the different products at the end of the pipeline loop. Such an operation has a number of shortcomings in that it is necessary to rely on the vagaries of the human eye and expend many man-hours in surveillance of the pipeline loop.

Thus, there has risen a need for a more effective way of controlling the flow rates in a pipeline loop to minimize admixture between the successive consignments of different products carried in a pipeline having such a loop.

Accordingly, an object of this invention is to provide an improved method and apparatus for controlling the rates of flow of fluid in a pipeline loop to minimize admixture between the successive consignments of different products carried in a pipeline having such a loop. Another object is to maintain the flow in the respective branches of a pipeline loop at substantially equal velocities during the passage of a change of product through the loop. Another object is to provide a method and apparatus to obtain relatively equal velocities in the flow of fluid through a pipeline having such a loop in the manner which is reliable and entails a minimium of surveillance and supervisory or maintenance effort. Another object is to calibrate flow control means associated with a pipeline loop to maintain substantially equal velocities through the branches of said loop. These and other objects and advantages of this invention will become apparent to those skilled in the art from the following discussion, appended claims, and accompanying drawing in which:

In accordance with this invention, detectors are positioned in each of the branches of pipeline loop at loci substantially equidistant from the point at which the branches of the loop are recombined, preferably adjacent the termini of such branches. These detectors are used to measure a characteristic property, such as dielectric constant, of the fluid flowing through the branches of the loop. The detectors will respond to changes in the selected property of the fluid, such changes being occasioned by the arrival of the point of separation or interface between two different products passed through the pipeline loop. The times of arrival of the interface in each of said branches at said detector loci are measured and the difference between the two found and recorded, along with the flow rate of the fluid through one of the branches in the loop. This procedure is used when one or more successive slugs or consignments of one fluid are introduced into the pipeline carrying a second fluid and passed to the loop at the same given flow rate, while the flow rate of fluid through one of the branches in the loop is changed for each slug to approximate equal velocities or flow rates in each of the branches toward the end that the slug segments in each of the loop branches arrive at the end of the loop at substantially the same time. The arrivals of the interfaces at the end of the loop are detected and the difference between arrivals found and recorded, as is outlined above. Eventually, for each given flow rate of product in the pipeline upstream of the loop there will be found the flow rate settings for one of the branches at which any fluid can be introduced into the loop such that substantially simultaneous arrival of the same fluid at the point of recombining will result. Thereafter, whenever a fluid is introduced into the pipeline loop at a given pipeline rate of flow, the flow rate setting in one of the branches of the loop can be adjusted according to said determination to ensure said simultaneous arrival at the end of the loop of such fluid, thereby minimizing the blending or admixture of such fluid with that of another fluid carried in the pipeline.

Figure 1:
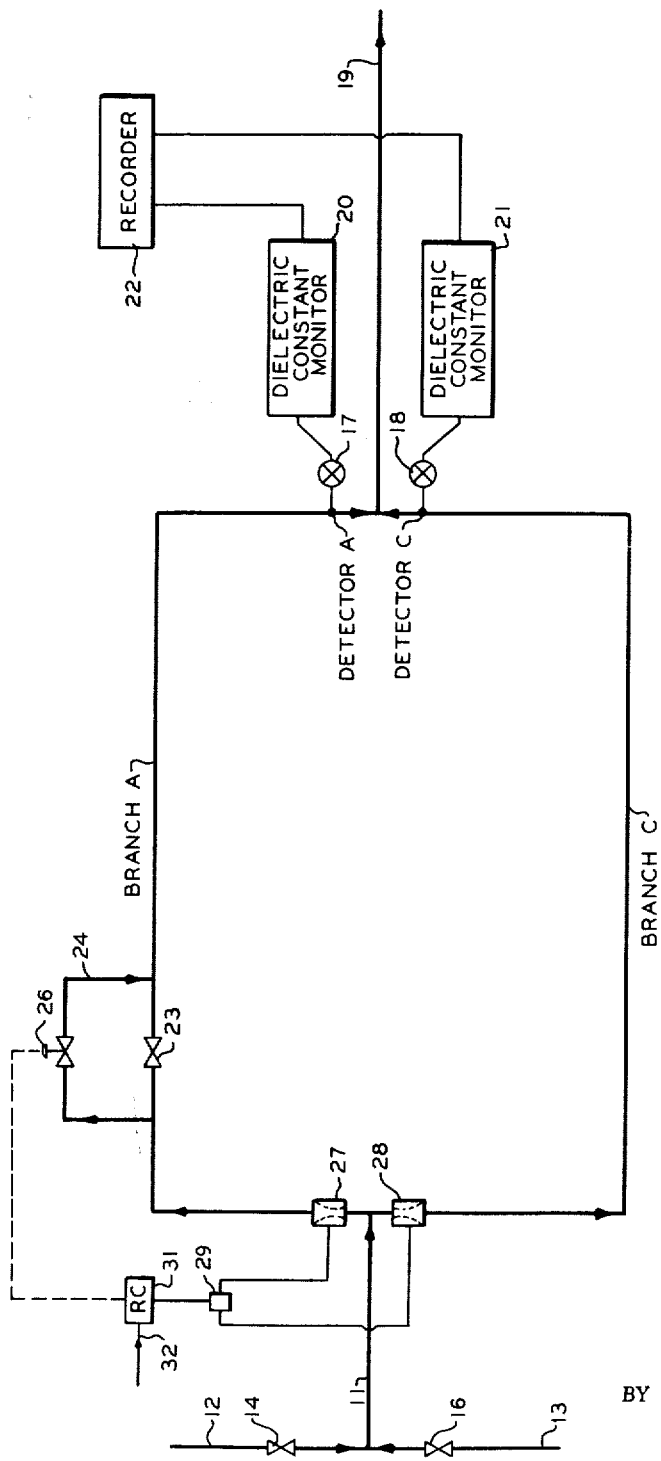
FIGURE 1 is a plan view of a pipeline loop with the features of this invention associated therewith.

A fuller understanding of this invention will be gained by referring now to FIGURE 1 of the accompanying drawing. In FIGURE 1, a pipeline 11, having supply lines 12 and 13 connected thereto with flow control valves 14 and 16 respectively positioned therein, is provided with a loop comprising branch A and branch C. The downstream ends of branches A and C are joined to a single or trunk pipeline 19, which is in effect a continuation of pipeline 11. The sizes of branches A and C can be the same, e.g., 8″ I.D., or different e.g., branch A can have an 8″ I.D. and branch C a 12″ I.D. Branches A and C will generally have substantially the same length.

Because of the differences in the sizes of the branches of a pipeline loop, variations in friction and elevation between certain points in the pipeline, the velocities or flow rates of fluid in the two branches of the loop will often tend to vary. In such cases when a change of product enters the pipeline loop, for example, where a slug of isopentane follows a slug of gasoline, arrival of the point of separation or interface between the two products, e.g., the front end of the isopentane slug, at the downstream end of each of the branches of the loop may substantially differ in time, the magnitude of this flow rate difference being primarily dependent upon the flow rate of fluid in the pipeline upstream of the loop. For example, the interface in one branch may arrive at the end of the loop as much as 30 minutes ahead of or behind the arrival of the interface at the end of the other branch. Consequently, undesirable blending or mixing of the different products will occur at the point of recombining, i.e., at the end of the loop.

To prevent or minimize such blending or different products we provide, according to our invention, the pipeline loop with an upstream flow rate control feature or means which is in effect calibrated by a downstream flow rate control feature or means for various given flow rates of fluid in the pipeline upstream of said loop.

Looking at FIGURE 1 again, we position one detector, detector A, in branch A near the end of the loop and another detector, detector C, also near the end of the loop. Said detectors are adapted to measure a selected or characteristic property of the fluid flowing through the pipeline loop, such as dielectric constant, thermal conductivity, density, refractive index, infrared absorption, etc. Detectors A and C are connected to suitable transmitters 17 and 18, respectively, which in turn transmit signals proportional to the measured value of the characteristic fluid property to associated monitoring and recording instruments, such as dielectric constant monitors 20 and 21, and recorder 22. A suitable, commercially available dielectric constant monitor is Model T.D.M. supplied by United Engineers, Inc. A suitable recorder which can be used to record the detector responses is Model AW Esterline-Angus Recording D.C. Milliammeter. Many other devices useful for these purposes are well-known to those skilled in the art. This instrumentation permits the continuous monitoring and recording of detector responses, such that the arrivals of the interfaces at the end of branches A and C are detected and recorded, and the difference between said arrivals together with the flow rate setting in one of the branches of the pipeline loop are found and recorded.

Branch A is provided with a flow control valve 23 and a secondary branch line 24 having a flow control valve 26 therein. The upstream ends of branches A and C are provided with differential pressure measuring means, such as Venturi nozzles 27 and 28, which in turn are connected to suitable means 29, e.g., a differential bellows assembly such as Model 199 Differential Pressure Unit supplied by Barton Instrument Corp., which measures the difference in the two differential pressures in branches A and C. Means 29 is in turn connected to a controller 31 having a manually adjustable set point 32. A suitable, commercially available instrument which can be used for this purpose is a Model 299 Differential Pressure Recording Pneumatic Controller supplied by the Barton Instrument Corp. and described in its Bulletin 259–1. The controller 31 is in turn connected to flow control valve 26 and designed to manipulate the same in accordance with the measured difference in differential pressure in the upstream ends of branches A and C, so as to approximate equal velocities or rates of flow in branches A and C. This upstream control means or feature requires calibration to ensure the simultaneous arrival of product at the end of the loop. Accordingly, this upstream control means is in effect calibrated by the aforementioned downstream control means or feature for various given flow rates of fluid in the pipeline upstream of the loop. This calibration feature will now be discussed.

Initially, a fluid, such as gasoline, is supplied via line 12 to pipeline 11 at a given flow rate, e.g., 2,000 bbls./hr., valve 14 being open for this purpose and valve 16 being closed. The differential pressures in branches A and C are measured by Venturi nozzles 27 and 28, respectively, and such pressures are transmitted to the differential bellows assembly 29, which measures the difference between said differential pressures, and a signal proportional to this differential is transmitted to controller 31. Controller 31 compares the signal from 29 with set point signal 32 and accordingly manipulates valve 26 in secondary branch line 24, either increasing or decreasing the opening thereof, so as to approximate and maintain the equal velocities or flow rates of fluid in branches A and C.

Thereafter, valve 14 is closed and valve 16 opened to permit the introduction of a slug of a different fluid, such as isopentane, into the pipeline loop. Valve 16 is kept open for a sufficient time, e.g., 15 minutes, to admit a slug of isopentane of suitable length into the pipeline loop. After the slug of isopentane is introduced into the pipeline loop at the same given flow rate, e.g., 2,000 bbls./hr., valve 16 is closed and valve 14 opened, to permit the movement of the slug of isopentane through the pipeline loop. The isopentane slug upon arrival at the upstream end of the loop divides into two slug segments, one of which passes through branch A and the other of which passes through branch C. The flow rates of the isopentane through the branches of the loop will, of course, be the same as that of the slug of gasoline which it follows, the set point of controller 31 remaining the same. The arrival of the slug segments at the ends of branches A and C will be detected by detectors A and C, respectively, since such detectors will respond to a change in the selected property of the fluid flowing past the loci of the detectors, such response being different for gasoline and isopentane. For example, the gasoline may have a dielectric constant of 2.044 and isopentane a dielectric constant of 1.941.

The detector responses are transmitted by transmitters 17 and 18 to the monitors 19 and 21, respectively, and signals proportional to those responses are transmitted to recorder 22, which can be a suitable chart recorder having a strip chart upon which two pens trace curves to record the continuous responses of both detectors. Alternatively, the outputs of each monitor, 19, 21 can be transmitted to separate recorders, the movement of the strip charts of each being synchronized. The charts on recorder 22 will show inflections corresponding to the differences in detector responses occasioned by the arrivals of the interfaces between the two different products at the loci of the detectors A and C. Such charts will be calibrated in terms of time, such that the times of the curve inflections can be found. Thus, the difference in the times of arrival of the two interfaces at the loci of detectors A and C can be determined.

Thereafter, the set point 32 of controller 31 is adjusted in an attempt to approximate the simultaneous arrival of interfaces at the end of the loop. After adjusting the set point 32, another slug of isopentane is introduced into the pipeline 11 via supply line 13, in the same manner as before, and the slug is passed to the loop at the same given rate of flow as before, e.g., 2,000 bbls./hr. The slug again divides at the upstream end of the loop and passes through the loop at the new relative flow rates. The arrivals of the slug segments at the loci of detectors A and C are again detected in the same manner as before, and the difference in said arrivals found. If this difference is not within an acceptable range, e.g., 2 seconds for each mile of loop, so as to minimize or prevent admixture of the different products, the set point 32 of controller 31 is again adjusted to approximate closer the simultaneous or acceptable arrival of fluid at the end of the loop, and another slug of isopentane passed into the loop at the same given upstream pipeline rate of flow and the upstream control means adjusted once more in response to the downstream calibration procedure. This operation is repeated until said simultaneous or acceptable arrival is assured.

Having thus determined for a given flow rate the set point value 32 for controller 31 to ensure simultaneous arrival of slug segments at the end of the loop, any time thereafter when fluid is introduced into the pipeline at the same given rate of flow this predetermined controller set point in branch A can be used to ensure said simultaneous time of arrival. The same calibration procedure can be repeated for any number of other given flow rates of fluid in the pipeline upstream of the loop.

Although in FIGURE 1 we have shown the controller 31 manipulating valve 26 in bypass line 24, it is within the scope of this invention to have the controller 31 manipulate valve 23 instead and eliminate branch line 24 and its valve 26. Since valve 26 is smaller than valve 24, we prefer to manipulate the former to obtain more accurate control. Valve 23 is manually adjusted to a fixed position from a closed position to an open position to provide the complete range of control desired.

Figure 2:
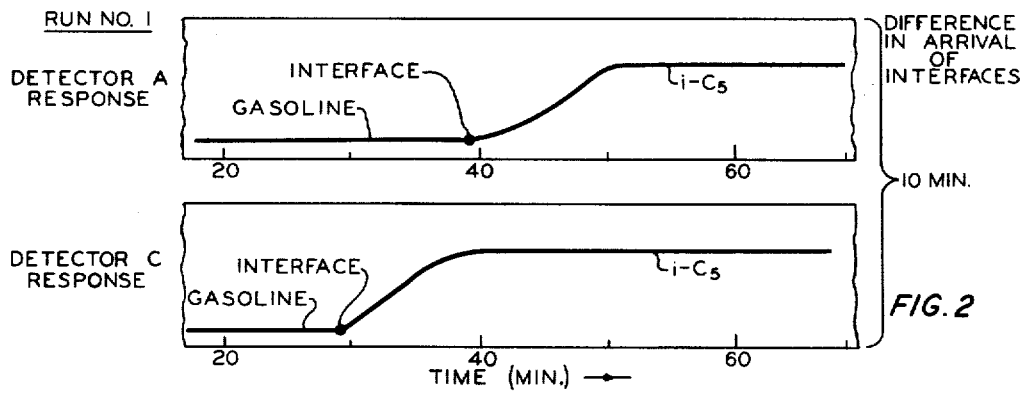
FIGURE 2 illustrates a typical chart obtained in the practice of this invention and used to regulate the flow of fluids in a pipeline loop and shows a time difference in arrival of interfaces.
Figure 2A:
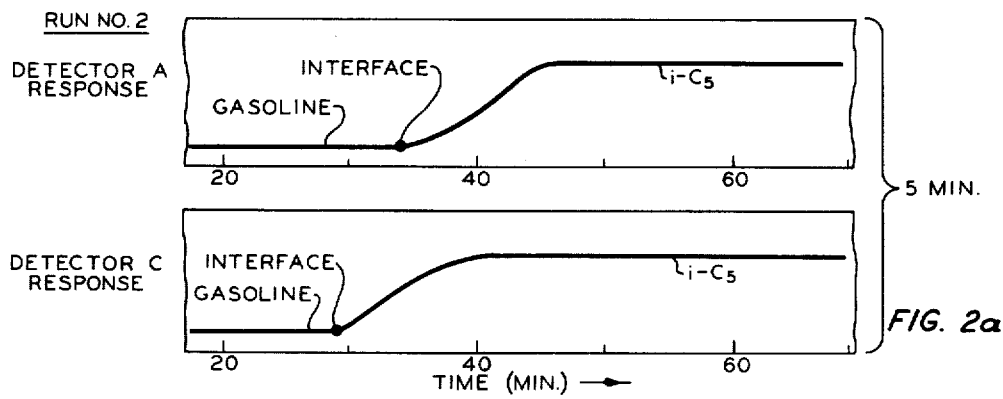
FIGURE 2a illustrates a similar chart showing a lesser time difference.
Figure 2B:
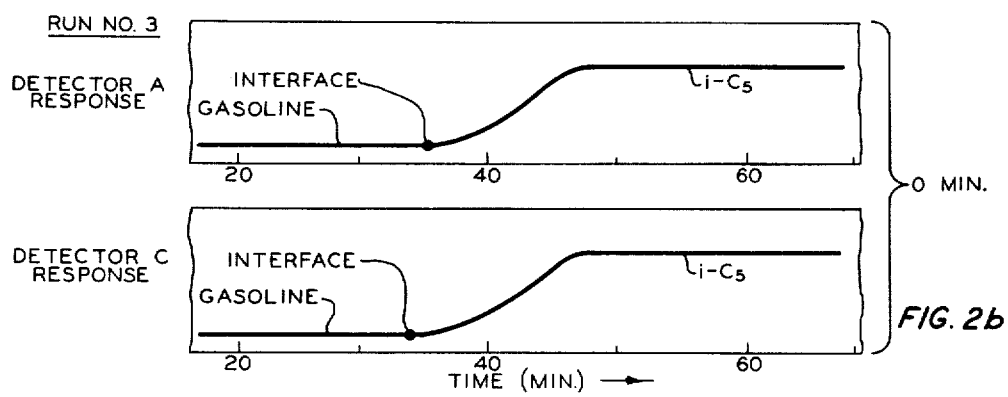
FIGURE 2b illustrates a similar chart showing a zero time difference.

A specific example of this invention will now be described and it should be read in conjunction with FIGURES 2, 2a and 2b. Assume a pipeline is employed where branch A is an 8.250" I.D. pipe, branch C is an 8.071" I.D. pipe, and both branches are about 7 miles in length. Secondary branch line 24 is a 3" I.D. pipe. Dielectric constant probes are positioned in each of branches A and C, 5 feet from the end of the loop. Assume that gasoline is initially introduced into the pipeline with an upstream flow rate of 2,000 bbls./hr. and that the set point of the controller is 2. Thereafter, isopentane is introduced into the pipeline for 15 minutes at the same upstream flow rate of 2,000 bbls./hr. The dielectric constant detectors or probes detect the arrivals of the interfaces between the gasoline and isopentane in each branch and it is found that the interface arrives at the end of branch A 10 minutes later than it arrives at the end of branch C, the set point of the controller still being held at 2. Accordingly, the set point of the controller is changed from 2 to 5, and another 15 minute slug of isopentane introduced into the pipeline at the same flow rate of 2,000 bbls./hr. In this second run, on examining the strip chart of the recorder, it is found that the interface in branch A arrives at the end of the loop 5 minutes after the arrival of the interface in branch C at the end of the loop. Accordingly, the set point of the controller is changed from 5 to 7, and another slug of isopentane is introduced into the pipeline at the same flow rate of 2,000 bbls./hr. In this third run, the strip chart of the recorder indicates that the interfaces in both of the branches arrived at the end of the loop at substantially the same time, e.g., 0 minutes. Thus, it is found that when fluid is introduced into the pipeline at a flow rate of 2,000 bbls./hr., simultaneous arrival of the interface between two different products at the end of the pipeline loop will result if the set point of the controller is held at 7.

This procedure is repeated for a number of other given flow rates, e.g., 1950 bbls./hr., 1900 bbls./hr., 1850 bbls./hr., . . . 1500 bbls./hr., etc., and the set points of the controller necessary to ensure the simultaneous arrival of production at the end of the loop for each of these given pipeline flow rates is found. Having gathered this data, a suitable calibration chart can be prepared and used in operation of the pipeline having such a loop, an example of such a calibration chart being shown in Table I.

*Table I*

| Flow rate of product in pipeline, bbls./hr.: | Controller set point necessary to ensure simultaneous arrival of product at end of loop |
| --- | --- |
| 2000 | 11 |
| 1950 | 10 |
| 1900 | 9 |
| 1850 | 8 |
| 1800 | 7 |
| 1750 | 6 |
| 1700 | 5 |
| 1650 | 4 |
| 1600 | 3 |
| 1550 | 2 |
| 1500 | 1 |

It should be understood that the terms "interface" and "point of separation" between different products are not used herein to necessarily mean a finite boundary but rather in their broad sense, such as to include an unavoidable minimum zone of mixing where the different products meet in the pipeline.

Variations and modifications of this invention will become apparent to those skilled in the art from the foregoing discussion and accompanying drawing, and it should be understood that this invention is not to be limited unduly to those preferred embodiments set forth herein for illustrative purposes.

We claim:

1. In a method of successively flowing different fluids through a pipeline having a loop at a given flow rate in the pipeline, wherein an interface is formed between such different fluids in each of the branches of said loop, the steps comprising introducing a first fluid into said pipeline at said given flow rate and passing the same through said loop, introducing a slug of a second fluid in said pipeline at said given flow rate and passing it through said loop, determining the arrival of segments of said slug in each of said branches at loci equidistant from the end of said loop, measuring the difference in said arrivals, changing the rate of flow through one of the branches of said loop to a second rate of flow in accordance with said difference in arrivals so as to approximate the simultaneous arrival of subsequent slug segments of said second fluid at the end of the loop, introducing a second slug of said second fluid into said pipeline at said given flow rate and passing slug segments thereof through said loop and through said one branch at said second rate of flow, determining the arrival of said subsequent slug segments in each of said branches at said loci, measuring the difference in said latter arrivals, changing said second rate of flow in accordance with said latter measured difference to a rate of flow so as to approximate closer the simultaneous arrival of said slug segments, and repeating said operation until a final rate of flow is determined whereby said slug segments substantially simultaneously arrive at the end of said loop, thereafter adjusting the rate of flow in said one branch to said final rate of flow whenever fluid is introduced into said pipeline at said given flow rate.

2. In a method of successively flowing different fluids through a pipeline having a loop at a given flow rate in the pipeline, wherein an interface is formed between such different fluids in each of the branches of said loop, the steps comprising introducing a first fluid into said pipeline at said given flow rate and passing the same through said loop, introducing a slug of a econd fluid in said pipeline at said given flow rate and passing it through said loop, introducing a slug of a second fluid in said flowing through each of said branches at loci equidistant from the end of said loop, determining the arrival of segments of said slug in each of said branches at said loci as indicated by a change in the value of said selected property, measuring the difference in said arrivals, changing the rate of flow through one of the branches of said loop to a second rate of flow in accordance with said difference in arrivals so as to approximate the simultaneous arrival of subsequent slug segments of said second fluid at the end of the loop, introducing a second slug of said second fluid into said pipeline at said given flow rate and passing slug segments thereof through said loop and through said one branch at said second rate of flow, determining the arrival of said subsequent slug segments in each of said branches at said loci as indicated by change in the value of said selected property, measuring the difference in said latter arrivals, changing said second rate of flow in accordance with said latter measured difference to a rate of flow so as to approximate closer the simultaneous arrival of said slug segments, and repeating said operation until a final rate of flow is determined whereby said slug segments substantially simultaneously arrive at the end of said loop, thereafter adjusting the rate of flow in said one branch to said final rate of flow whenever fluid is introduced into said pipeline at said given flow rate.

3. In a method of successively flowing different fluids through a pipeline having a loop at a given flow rate, wherein an interface is formed between said different fluids in each of the branches of said loop, the steps comprising introducing a first fluid into said pipeline at a first given flow rate and passing the same through said loop, introducing a slug of a second fluid in said pipeline at said first given flow rate and passing it through said loop, continuously monitoring the dielectric constant of the fluid flowing through each of said branches at loci adjacent the end of each of said branches, determining the arrival of segments of said slug in each of said branches at said loci as indicated by a change in the value of the dielectric constant of the fluid flowing in said branches, measuring the difference in said arrivals, changing the rate of flow through one of the branches of said loop to a second rate of flow in accordance with said difference in arrivals so as to approximate the simultaneous arrival of subsequent slug segments of said second fluid at the end of the loop, introducing a second slug of said second fluid into said pipeline at said first given flow rate and passing slug segments thereof through said loop and through said one branch at said second rate of flow, determining the arrival of said subsequent slug segments in each of said branches at said loci as indicated by a change in the value of the dielectric constant of the fluid flowing in said branches, measuring the difference in said latter arrivals, changing said second rate of flow in accordance with said latter measured difference to a rate of flow so as to approximate closer the simultaneous arrival of said slug segments, repeating said operation of introducing slugs of said second fluid at said first given flow rate, determining the arrival of slug segments at the end of said loop, and changing the rate of flow through said one branch, until a final rate of flow is determined whereby said slug segments substantially simultaneously arrive at the end of said loop, repeating said operation for other given flow rates of fluid in said pipeline, and thereafter adjusting the rate of flow in said one branch to one of the final rates of flow whenever fluid is introduced into said pipeline at one of said given flow rates.

4. Apparatus for minimizing the admixture of different fluids successively introduced into a pipeline having a loop comprising two branches, which apparatus comprises means for measuring the difference in flow rates in the upstream ends of said branches, flow control means in one of said branches for controlling the flow rate of fluid therethrough in accordance with said difference, means in each of said branches adjacent the downstream ends thereof for measuring a selected property the value of which characterizes the fluid flowing through said branches, means for detecting a change in the value of said selected property occasioned by the arrival of an interface between said different fluids in each of said branches adjacent the downstream ends thereof, and means for changing said flow rate control means in accordance with the difference in said arrivals of said interfaces to ensure the substantially simultaneous arrival of said interfaces at the end of said branches.

5. Apparatus according to claim 4, wherein said means for measuring a selected property comprises dielectric constant probe means, and said means for detecting a change in the value of said selected property comprises recorder means which plots on a chart the response of said dielectric constant probe means as a function of time.

References Cited in the file of this patent

UNITED STATES PATENTS

| | | |
|---|---|---|
| 1,333,986 | Lundgaard | Mar. 16, 1920 |
| 1,363,513 | Keith | Dec. 28, 1920 |
| 2,295,366 | Stout | Sept. 8, 1942 |
| 2,859,757 | Parsons | Nov. 11, 1958 |

UNITED STATES PATENT OFFICE
CERTIFICATE OF CORRECTION

Patent No. 3,095,888                          July 2, 1963

Marvin E. Kline et al.

It is hereby certified that error appears in the above numbered patent requiring correction and that the said Letters Patent should read as corrected below.

Column 7, line 4, for "econd" read -- second --; line 6, for "introducing a slug of a second fluid in said" read -- monitoring a selected property of the fluid --.

Signed and sealed this 31st day of March 1964.

(SEAL)
Attest:

ERNEST W. SWIDER                        EDWARD J. BRENNER

Attesting Officer                            Commissioner of Patents